US009826020B2

(12) United States Patent
Doyle et al.

(10) Patent No.: US 9,826,020 B2
(45) Date of Patent: Nov. 21, 2017

(54) NETWORK-AWARE STRUCTURED CONTENT DOWNLOADS

(71) Applicant: International Business Machines Corporation, Armonk, NY (US)

(72) Inventors: Ronald P. Doyle, Raleigh, NC (US); David L. Kaminsky, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 14/465,591

(22) Filed: Aug. 21, 2014

(65) Prior Publication Data

US 2014/0365618 A1    Dec. 11, 2014

Related U.S. Application Data

(63) Continuation of application No. 13/435,091, filed on Mar. 30, 2012, now Pat. No. 8,930,448, which is a
(Continued)

(51) Int. Cl.
*H04L 29/08* (2006.01)
*G06F 17/30* (2006.01)
*H04W 4/18* (2009.01)

(52) U.S. Cl.
CPC ........ *H04L 67/06* (2013.01); *G06F 17/30899* (2013.01); *H04L 67/02* (2013.01);
(Continued)

(58) Field of Classification Search
CPC ..... H04L 67/32; H04L 67/02; H04L 67/2847; H04L 67/322; H04L 65/80;
(Continued)

(56) References Cited

U.S. PATENT DOCUMENTS 7,010,681 B1    3/2006  Fletcher et al.
7,668,932 B2 *  2/2010  Cugi ................ G06F 17/30899
                                                                709/217
(Continued)

FOREIGN PATENT DOCUMENTS

WO    0246946 A1    6/2002

OTHER PUBLICATIONS

United States Patent and Trademark Office, Notice of Allowance for U.S. Appl. No. 13/435,091, Sep. 4, 2014, pp. 1-34, Alexandria, VA, USA.
(Continued)

*Primary Examiner* — Vivek Srivastava
*Assistant Examiner* — Muhammad Raza
(74) *Attorney, Agent, or Firm* — Lee Law, PLLC; Christopher B. Lee

(57) ABSTRACT

A request for content is sent, using a client device, to a content server through a first network connection. A root document is received from the content server. The root document includes at least one content stub, where each content stub identifies a respective portion of the content as a deferred portion of the content and includes a content identifier of the respective deferred portion of the content. A network connection change to the content server from the first network connection to a second network connection is detected. A determination is made to download at least one deferred portion of the content through the second network connection based upon a configured download constraint assigned to the deferred portion of the content and a network characteristic of the second network connection. The deferred portion of the content identified by the respective content stub is obtained.

12 Claims, 8 Drawing Sheets

Related U.S. Application Data continuation of application No. 13/032,122, filed on Feb. 22, 2011, now abandoned.

(52) U.S. Cl.
CPC .............. *H04L 67/10* (2013.01); *H04L 67/32* (2013.01); *H04W 4/18* (2013.01)

(58) Field of Classification Search
CPC ......... G06F 17/30899; G06F 17/30902; G06F 12/0862; H04W 40/00; H04W 48/18
See application file for complete search history.

(56) References Cited

U.S. PATENT DOCUMENTS

| | | |
|---|---|---|
| 2002/0110149 A1 | 8/2002 | Roberts et al. |
| 2002/0116251 A1 | 8/2002 | Chen et al. |
| 2003/0011631 A1 | 1/2003 | Halahmi |
| 2004/0176080 A1* | 9/2004 | Chakravorty ...... G06Q 30/0621 455/414.1 |
| 2005/0193068 A1 | 9/2005 | Brown et al. |
| 2005/0265345 A1 | 12/2005 | Chen et al. |
| 2006/0195507 A1* | 8/2006 | Baek ................. G06F 17/30905 709/203 |
| 2007/0204057 A1* | 8/2007 | Shaver .............. G06F 17/30902 709/231 |
| 2007/0204115 A1* | 8/2007 | Abramson ............ H04L 67/06 711/154 |
| 2007/0209005 A1* | 9/2007 | Shaver ................ G06F 17/3089 715/733 |
| 2008/0119218 A1 | 5/2008 | Dumitru et al. |
| 2008/0307527 A1 | 12/2008 | Kaczmarski et al. |
| 2009/0156209 A1 | 6/2009 | Franklin et al. |
| 2010/0011052 A1 | 1/2010 | Gharabally et al. |
| 2010/0235472 A1* | 9/2010 | Sood ................... H04L 65/4092 709/219 |
| 2011/0029899 A1 | 2/2011 | Fainberg et al. |
| 2011/0078325 A1* | 3/2011 | Vanover ................. H04L 63/10 709/232 |
| 2012/0149417 A1* | 6/2012 | Akhtar ............. G06F 17/30902 455/509 |

OTHER PUBLICATIONS

United States Patent and Trademark Office, Office Action for U.S. Appl. No. 14/047,787, Mar. 3, 2015, pp. 1-31, Alexandria, VA, USA.

PCT International Searching Authority, Written Opinion and International Search Report for PCT Application No. PCT/CA2012/050102, Jul. 3, 2012, pp. 1-8, Gatineau, Quebec, CA.

United States Patent and Trademark Office, Office Action for U.S. Appl. No. 13/032,122, Mar. 28, 2013, pp. 1-20, Alexandria, VA, USA.

United States Patent and Trademark Office, Notice of Allowance for U.S. Appl. No. 13/032,122, Jul. 17, 2013, 2013, pp. 1-19, Alexandria, VA, USA.

United States Patent and Trademark Office, Office Action for U.S. Appl. No. 14/047,787, Aug. 17, 2015, pp. 1-20, Alexandria, VA, USA.

United States Patent and Trademark Office, Notice of Allowance for U.S. Appl. No. 14/047,787, Mar. 15, 2016, pp. 1-7, Alexandria, VA, USA.

United States Patent and Trademark Office, Office Action for U.S. Appl. No. 14/047,787, Jan. 6, 2016, pp. 1-22, Alexandria, VA, USA.

United States Patent and Trademark Office, Office Action for U.S. Appl. No. 15/155,648, dated Aug. 1, 2017, pp. 1-34, Alexandria, VA, USA.

* cited by examiner

NETWORK-AWARE STRUCTURED CONTENT DOWNLOADS

RELATED APPLICATIONS

This application is a continuation of and claims priority to and claims the benefit of U.S. patent application Ser. No. 13/435,091 titled "NETWORK-AWARE STRUCTURED CONTENT DOWNLOADS," which was filed in the United States Patent and Trademark Office on Mar. 30, 2012, and further claims priority to and claims the benefit of U.S. patent application Ser. No. 13/032,122 titled "NETWORK-AWARE STRUCTURED CONTENT DOWNLOADS," which was filed in the United States Patent and Trademark Office on Feb. 22, 2011, both of which are incorporated herein by reference in their entirety. This application is also related to U.S. patent application Ser. No. 14/047,787 titled "NETWORK-AWARE STRUCTURED CONTENT DOWNLOADS," which was filed in the United States Patent and Trademark Office on Oct. 7, 2013, and which is incorporated herein by reference in its entirety.

BACKGROUND

The present invention relates to content downloads for mobile and other devices. More particularly, the present invention relates to network-aware structured content downloads.

Computer networks allow computing devices to interconnect to servers to access and/or download content. Computer networks may provide one or more of wired and wireless connectivity for computing devices. Computer networks may also provide a variety communication protocols for use by computing devices.

BRIEF SUMMARY

A method includes sending, via a client device, a request for content to a content server via a first network connection; receiving, from the content server, a root document comprising at least one content stub, where each of the at least one content stub identifies a respective portion of the content as a deferred portion of the content and comprises a content identifier of the respective deferred portion of the content; detecting a network connection change to the content server from the first network connection to a second network connection; determining to download at least one deferred portion of the content via the second network connection based upon a configured download constraint assigned to the at least one deferred portion of the content and a network characteristic of the second network connection; and obtaining the at least one deferred portion of the content identified by the respective content stub.

A system includes a communication module; and a processor programmed to: send, via the communication module, a request for content to a content server via a first network connection; receive, from the content server, a root document comprising at least one content stub, where each of the at least one content stub identifies a respective portion of the content as a deferred portion of the content and comprises a content identifier of the respective deferred portion of the content; detect a network connection change to the content server from the first network connection to a second network connection; determine to download at least one deferred portion of the content via the second network connection based upon a configured download constraint assigned to the at least one deferred portion of the content and a network characteristic of the second network connection; and obtain the at least one deferred portion of the content identified by the respective content stub.

A computer program product includes a computer readable storage medium having computer readable program code embodied therewith, where the computer readable program code when executed on a computer causes the computer to: send a request for content to a content server via a first network connection; receive, from the content server, a root document comprising at least one content stub, where each of the at least one content stub identifies a respective portion of the content as a deferred portion of the content and comprises a content identifier of the respective deferred portion of the content; detect a network connection change to the content server from the first network connection to a second network connection; determine to download at least one deferred portion of the content via the second network connection based upon a configured download constraint assigned to the at least one deferred portion of the content and a network characteristic of the second network connection; and obtain the at least one deferred portion of the content identified by the respective content stub.

DETAILED DESCRIPTION

Figure 1:
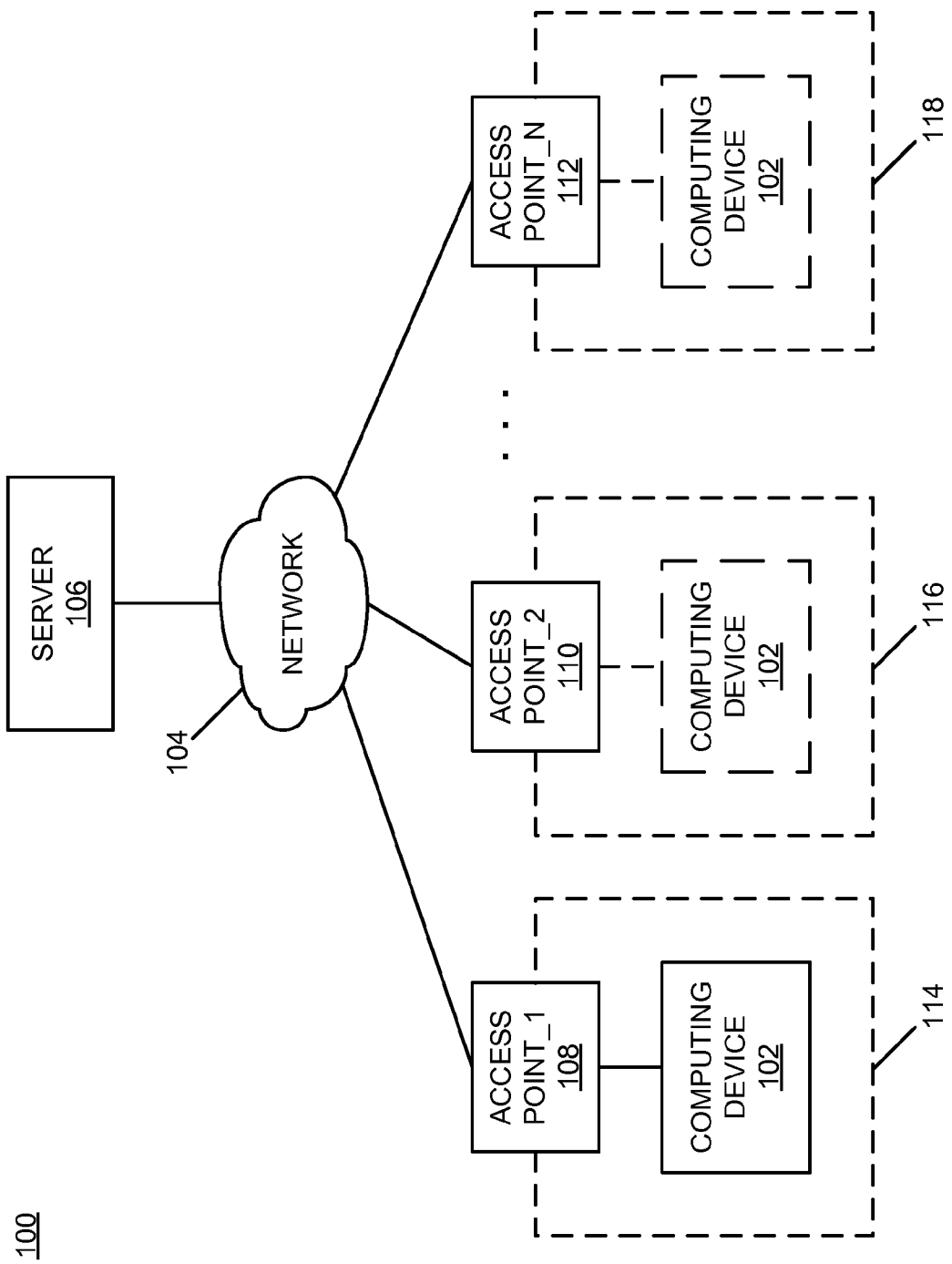
FIG. 1 is a block diagram of an example of an implementation of a system for network-aware structured content downloads according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides network-aware structured content downloads. The network-aware structured content downloads described herein provides an automated intelligent content download approach that may be adapted to multiple network connections and capabilities. Content server devices and client devices capable of connection to the content server devices via multiple network connections and/or networks at one or more locations each process download constraints associated with content downloads. Different download constraints may be assigned to different portions of content within the same content document (e.g., a "root" document). At the content server, download constraints associated with content requests may be evaluated against current network characteristics in response to content requests. Portions of the content may be deferred for later download or contemporaneous download via a different network connection where the network connection meets the content download constraints (e.g., if the download constraints exceed current network connection characteristics). Deferred content is identified within the root document by replacing content tags associated with the deferred content with content stubs. Each content stub identifies the respective portion of content as deferred content and includes a content identifier of the deferred content. Content stubs may also include download constraints.

In response to receipt of the root document including any identified deferred content, the client device may search for a currently accessible network (e.g., via one or more available network connections) that satisfies the download constraints and download the deferred content if such a currently accessible network connection is available. Alternatively, if a different network and/or network connection that satisfies the download constraints is not currently available, the client device may configure automated download of the deferred content in response to detection of and connection to a network connection that satisfies the download constraints for the deferred content. The client device may also prompt a user with respect to download preferences for the deferred content and may configure automated download in response to detection of user input of the download preferences. Additionally, the content server may also be configured for automated detection of the client device to the server via a different network connection that satisfies the respective download constraints of deferred portions of content and may initiate download of the deferred content portions to the client device. As such, either or both of the client device and the server device may be configured for automated network-aware structured content downloads and may coordinate download of deferred content as one or more different networks and/or network connections that satisfy download constraints of different portions of the root document become available.

The description below utilizes the terms "network," "network connection," and "connection" interchangeably for ease of description. These terms are not intended to be limited to either physical or even protocol-layer connections, such as a transmission control protocol/Internet protocol (TCP/IP socket), but may also include properties of a logical network connection between two communicating devices. For example, if Device A is connected to Device B via a TCP/IP socket, and the network speed available to that socket increases from two hundred and fifty six kilobits per second (256 Kbits/sec) to two megabits per second (2 Mbits/sec), then for the purpose of the present subject matter, the network connection may be considered to have changed, though the protocol connection (and perhaps even the underlying network) may not have changed. As such, it is possible that a network connection, such as a TCP/IP socket, may remain in place in association with a given network, but that network characteristics (e.g., speed, security, etc.) as described in more detail below of the underlying network may change. A change in a network connection may further include a change to a different network connection via the same network with different network characteristics, a change to a different network connection via a different network with different network characteristics, or any other change of connection that provides communication capabilities as described herein. Changes to the protocol-layer connection or to the physical connection may result in changes to the network connection as defined here, but changes to physical or protocol connections are not required to be considered a change of "connection" that may be detected and processed as described herein. Accordingly, the description herein is directed to such changes in network connection irrespective of use of the terms "network," "network connection," and "connection" in association with any given example.

A content request may include a request for a web page, a request for e-mail replication, or any other content request as appropriate for a given implementation. A root document may include, for example, an extensible markup language (XML) document, an email document, an email attachment, or other document that may include content portion delineation and identification, and that may include tagging capabilities for insertion of stubs.

As an example of use of multiple networks, a client device used by a user that is leaving work and walking to a train station may pass/handoff from a corporate wireless fidelity (Wi-Fi) intranet connection that is protected by a firewall to an external public or private wireless network. The corporate Wi-Fi intranet connection may likely provide better security for most business content accesses and download constraints may be utilized to defer content downloads based upon a security level of the respective current network connection. Alternatively, the client device may be used by the user while traveling on a train from work to home and may pass/handoff connectivity from a fourth generation (4G) network to a third generation (3G) network, or possibly to a wireless fidelity (Wi-Fi) network provided by a public transportation company, all while working on the same task. Certain of these networks may provide better download bandwidth and performance, and download constraints may be utilized to defer content downloads based upon a network speed of the respective current network connection. As such, download constraints may be leveraged to defer portions of content for situations such as these or other situations as appropriate for a given implementation. Many other examples of use of download constraints for managing download of portions of content are possible and all are considered within the scope of the present subject matter.

As described above, the deferred content is identified within the root document by the content server replacing content tags within the root document that are associated with the deferred content with content stubs. Content stubs may be considered content fragments that replace original content fragments. For documents formatted with a markup language such as XML, a content stub may be considered an XML fragment.

Replacement of content tags with a content stub may include, for example, insertion of a different stub content tag pair and other information as appropriate for a given implementation at a location within the root document where the original content references were located. Some examples of a content stub/content stub pair may include tags such as "<stub> and </stub>," "<deferred> and </deferred>," or other references as appropriate for a given implementation. The content stub may include a content pointer to the respective deferred portion of the content. Examples of a content pointer may include a link such as a uniform resource locator (URL), a text attribute, or other content pointer as appropriate for a given implementation. A text attribute content pointer may identify the tag pair identifier that was replaced with the content stub as text associated with a stub tag pair. Additionally, attributes may be generated in association with content stubs that identify/define the download constraints for one or more deferred portions of content within a root document. The client device may utilize the identified download constraints for automated processing for retrieval of the content via one or more alternative networks, either in real time or as other networks become available.

Download constraints may be considered rules or policies that identify/determine when and under what conditions content or portions of content may be downloaded. As such, download constraints provide granular control of download of portions of content. Download constraints may include a variety of content characteristics as described in more detail below and may be combined with one another to form compound download constraints. Any form of rule or policy indication may be used to identify download constraints in association with portions of content as appropriate for a given implementation. For example, download constraints may be identified using attributes associated with content elements (e.g., data elements, links, etc.) within a root document such as a web page or email document/attachment.

Examples of download constraints that may be used to control download of portions of content include a size of each portion of the content within a root document, a content type associated with each portion of content (e.g., MPEG4, MP3, etc.), a content source (e.g., all content from a manager/boss may be downloaded regardless of network connection speed, while content from a friend may be processed when network speed is appropriate for the particular content, etc.), a minimum network download speed for download of the content, a minimum network download speed for a type of content, and a minimum communication resource utilization availability (e.g., processor usage, number of ports, etc.). Additional examples of download constraints include a security classification (e.g., security level) of each portion of the content, a minimum network security level for download of the content portion, an account download bandwidth limitation (e.g., where a periodic limit for download bandwidth is associated with a user account), an account download cost limitation (e.g., where a cost is associated with download within a user account), and an account connectivity cost limitation (e.g., where an additional fee is charged for roaming or for content download while roaming). Many other download constraints are possible and all are considered within the scope of the present subject matter.

As another alternative, the client device may specify download constraints within the content request to the content server. In such an implementation, where a download constraint such as an account download bandwidth limitation or an account download cost limitation exists for a user account of a client device, the client device may impose a download constraint within one or more content download requests. For example, the client device may be configured to automatically manage content downloads by requesting only a portion of content for each message (e.g., request only "N" kilobytes or megabyte per message). Alternatively, the client device may be configured to monitor content downloads over a period of time, such as a billing cycle, and dynamically reduce download volume as a bandwidth or billing limit approaches. Many other possibilities exist for client download constraint management and all are considered within the scope of the present subject matter.

The network-aware structured content downloads described herein may be performed in real time to allow prompt partitioned download of structured content. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for network-aware structured content downloads. A computing device 102 communicates via a network 104 with a server 106. The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices. It is further noted that the network 104 is shown as a single network for purposes of illustration, but that multiple networks may be utilized as appropriate for a given implementation. It is further understood that the computing device 102 may communicate with multiple servers, such as the server 106. However, the single server 106 is described to reduce complexity of the present description.

The computing device 102 may communicate with servers, such as the server 106, via one or more of an access point_1 108, an access point_2 110, through an access point_N 112. Each of the access point_1 108, the access point_2 110, through the access point_N 112 is associated with a location 114, a location 116, through a location 118, respectively.

It is noted that the computing device 102 is shown with a solid-line representation within the location 114 and that the computing device 102 is shown with a dashed-line representation within each of the location 116 and the location 118. As such, for purposes of the present example, it is assumed that the computing device 102 may be a portable/mobile computing device, either by a user's ability to move the computing device 102 to different locations, or by the computing device 102's association with a portable platform, such as a plane, train, automobile, or other moving vehicle, and that the computing device 102 may be moved between the locations 114 through 118. However, it should be noted that while the present example illustrates each of the access point_1 108 through the access point_N 112 associated with a different location, two or more of the access point_1 108 through the access point_N 112 may be accessible via the computing device 102 at a single location without departure from the scope of the present subject matter. Accordingly, a computing device, such as the computing device 102, may connect to the server 106 via two or more access points at a single location.

It should also be noted that both the server 106 and the computing device 102 may include any computing device capable of processing information as described above and in more detail below. For example, while not limiting, the server 106 may include a web server, email server, or other content server. Either the server 106 or the computing device 102 may include devices such as a personal computer (e.g., desktop, laptop, etc.) or a handheld device (e.g., cellular telephone, personal digital assistant (PDA), email device, music recording or playback device, etc.), or any other device capable of processing information as described above and in more detail below.

Each of the access point_1 108 through the access point_N 112 may include either a wired or a wireless access point via which the computing device 102 may access the server 106. Further, each of the access point_1 108 through the access point_N 112 may represent a different type of network connection to the server 106. As such, each of the access point_1 108 through the access point_N 112 may provide different connectivity capabilities, such as speed, security, or other capabilities.

For purposes of the present example, it is assumed that the access point_1 108 represents a wired secured firewalled network connection and that the location 114 represents a work location. It is also assumed that the access point_2 110 represents a fourth generation (4G) wireless network access point and that the location 116 represents a downtown metropolitan location. It is further assumed that the access point_N 112 represents a third generation (3G) wireless network access point and that the location 118 represents a rural community location such as a location proximate to a home of a user of the computing device 102.

As such, the user of the computing device 102 may travel between work and home and the computing device 102 may be connected to the server 106 via the respective access points. Within the present example, the user may take the computing device 102 from the wired secured firewalled network connection at work, access a relatively high-speed wireless network connection upon exiting the work facilities, and access a relatively lower-speed wireless network connection in proximity to home. Accordingly, each network access provided by the access point_1 108 through the access point_N 112 may provide one of a different level of security and a different network access speed, or other capabilities.

As will be described in more detail below in association with FIG. 2 through FIG. 6B, the computing device 102 provides automated network-aware structured content downloads. The automated network-aware structured content downloads is based upon detection of network connectivity and characteristics of a given network connection, coupled with analysis of configured/defined download constraints for portions of content, to control download of different portions of the same content via network connections that are appropriate based upon the configured/defined download constraints associated with different portions of the content.

Figure 2:
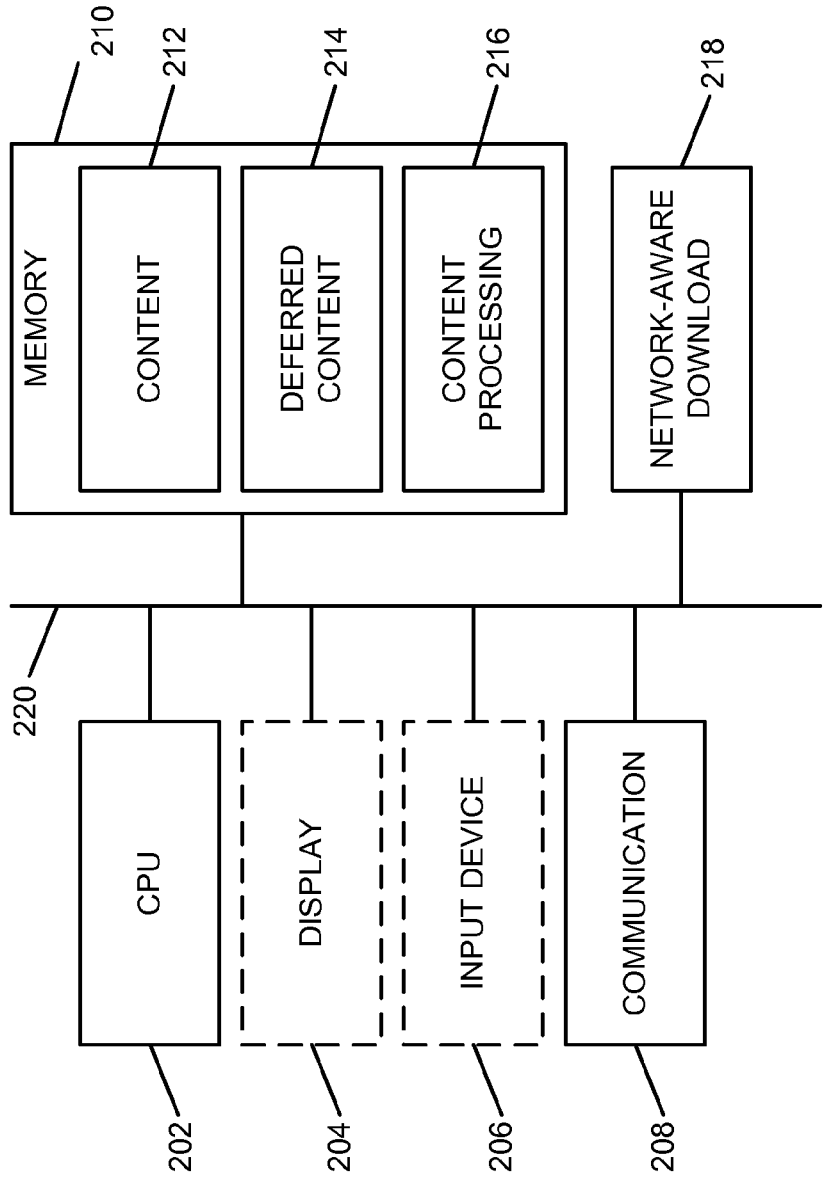
FIG. 2 is a block diagram of an example of an implementation of a core processing module capable of performing automated network-aware structured content downloads according to an embodiment of the present subject matter.

FIG. 2 is a block diagram of an example of an implementation of a core processing module 200 capable of performing automated network-aware structured content downloads. The core processing module 200 may be associated with either the computing device 102 or the server 106, as appropriate for a given implementation. Further, the core processing module 200 may provided different and complementary processing of download constraints based upon current network characteristics in association with each implementation, as described in more detail below. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations, such as the server 106 that is accessible and/or configured remotely. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as the server 106 when implemented in association with the computing device 102, and vice versa, to allow communication between the two devices via the network 104. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a content storage area 212 that stores content for use by the core processing module 200. For example, the content storage area 212 may store content for download where the core processing module 200 is associated with a server, such as the server 106. Alternatively, the content storage area 212 may store content that has been downloaded where the core processing module 200 is associated with a computing device, such as the computing device 102. The content storage area 212 may also store download constraints as described above and in more detail below that are associated with portions of stored content.

The memory 210 also includes a deferred content storage area 214. The deferred content storage area 214 may store identifiers of content that has been deferred for later download. A content processing storage area 216 stores characteristics associated with content that is either available for download via the server 106 or that has been downloaded to the computing device 102. The content processing storage area 216 may also store configurations and automated content download profiles that may trigger download of deferred content in response to detection of network connectivity that satisfies any applicable download constraints for one or more portions of deferred content. Further, content stubs including deferred content identifiers, as described above and in more detail below, may be stored within the content processing storage area 216. Many other content storage options exist and all are considered within the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A network-aware download module 218 is also illustrated. The network-aware download module 218 provides automated management for deferred downloads within the core processing module 200, as described above and in more detail below. The network-aware download module 218 implements the automated network-aware structured content downloads of the core processing module 200.

Though the network-aware download module 218 is illustrated as a component-level module for ease of illustration and description purposes, it should be noted that the network-aware download module 218 may include any hardware, programmed processor(s), and memory used to carry out the functions of this module as described above and in more detail below. For example, the network-aware download module 218 may include additional controller circuitry in the form of application specific integrated circuits (ASICs), processors, and/or discrete integrated circuits and components for performing communication and electrical control activities associated with the respective devices. Additionally, the network-aware download module 218 may also include interrupt-level, stack-level, and application-level modules as appropriate. Furthermore, the network-aware download module 218 may include any memory components used for storage, execution, and data processing for performing processing activities associated with the module.

It should also be noted that the network-aware download module 218 may form a portion of other circuitry described without departure from the scope of the present subject matter. Further, the network-aware download module 218 may alternatively be implemented as an application stored within the memory 210. In such an implementation, the network-aware download module 218 may include instructions executed by the CPU 202 for performing the functionality described herein. The CPU 202 may execute these instructions to provide the processing capabilities described above and in more detail below for the core processing module 200. The network-aware download module 218 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the network-aware download module 218 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

The following pseudo code examples represent certain possibilities for implementation of network-aware structured content downloads. The following examples are presented in extensible markup language (XML) pseudo syntax for reference and are directed to certain content types. However, it is understood that any syntax may be used as appropriate for a given implementation and that other content types are available. As such, many other possibilities for implementation of network-aware structured content downloads exist and all are considered within the scope of the present subject matter. Further, for purposes of the present description, the pseudo code examples represent content within a single content file that may be considered a single "root" content file.

The first example pseudo code below illustrates one example of a body of an original content file that may be stored on a server, such as the server 106. The content within the body of the original content file includes three sections or portions, as described in more detail below following the first example pseudo code.

```
<Body>
<!-- Static Content that may not be affected by network or security
conditions -->
<person_list>
    <resident>
        <name>David</name>
    </resident>
</person_list>
<!-- Large File section of movies and pictures -->
<titles>
    <movie>
        <file="video.mpg" />
    </movie>
    <picture>
        <file="face.jpg"/>
```

```
    </picture>
</titles>
<!-- Sensitive Information designated for distribution via a secure channel
-->
<salary>
    <resident>
        <name>David</name>
        <income>750000</income>
        <taxbracket>35</taxbracket>
    </resident>
</salary>
...
</Body>
```

As can be seen from the first example pseudo code above, three portions of content are identified by comments for ease of description. The first portion of the content is indicated to include static content that may not be affected by network or security conditions. This static content includes an attribute that includes a text value associated with a "name" tag pair. The second portion of the content is indicated to include large file section, such as movies and pictures. The large file section includes file identifiers of the form "file" that are used to reference individual files within the content. These file identifiers trigger download of the respective files in response to attempts by client devices, such as the computing device 102, to render the second portion of the content. The third portion of the content is indicated to include sensitive information designated for distribution via a secure channel. This sensitive information includes attributes that include text values associated with a "name" tag pair, an "income" tag pair, and a "tax bracket" tag pair. Processing of each of these portions of the body of the file represented by the first example pseudo code above may differ based upon current network connectivity of the computing device 102 to the server 106.

For purposes of the present example, it is assumed that the client device 102 requested the content file that includes the first example pseudo code above via an unsecure connection and that the unsecure connection is a lower bandwidth connection, such as a 3G connection rather than a faster 4G connection. As such, the present example aligns with the access point_N 112 that represents a third generation (3G) without network security features or speed capabilities of the access point_1 108 and the access point_2 110, respectively. It is further assumed that server 106 is configured to automatically defer secure/sensitive content associated with requests over unsecure connections and to automatically defer larger content associated with requests over lower-bandwidth connections. For purposes of the present example, it is further assumed that the server 106 may be configured to automatically defer the respective portions by either analysis of the comment block associated with each content portion (e.g., by use of the comment text "Static Content," "Large file," and "Sensitive Information"), respectively, or by analysis of the file identifiers or tag pairs (e.g., "file," "income," "taxbracket"), respectively.

The second example pseudo code below illustrates one example of a body of the original content file that may be downloaded to the computing device 102 in response to a request for the content file via the unsecure lower-bandwidth connection. The content within the body of the original content file again includes the three sections or portions described above in association with the first example pseudo code. However, certain portions of the original content have been replaced with content stubs, as described above and in more detail below following the first example pseudo code.

```
<Body>
<!-- Static Content not affected by network or security conditions -->
<person_list>
    <resident>
        <name>David</name>
    </resident>
</person_list>
<!-- Large File section of movies and pictures -->
<titles>
    <movie>
        <stub>
            <deferfile="video.mpg"/>
        </stub>
    </movie>
    <picture>
        <stub>
            <deferfile="face.jpg"/>
        </stub>
    </picture>
</titles>
<!-- Sensitive Information requiring secure channel -->
<salary>
    <resident>
        <name>David</name>
        <stub>
            <securecontent>
                <tag="income"/>
            </securecontent>
        </stub>
        <stub>
            <securecontent>
                <tag="taxbracket"/>
            </securecontent>
        </stub>
    </resident>
</salary>
...
</Body>
```

As can be seen from the second example pseudo code above, the static content has been distributed by the server 106 without deferral in response to the request from the computing device 102. However, the file links represented as file identifiers within the original "Large File" section of the content of the first example pseudo code above have been replaced with a stub.

The stub is illustrated within the second example pseudo code as a "stub" tag pair inserted into the location within the original content where the file identifiers were originally located. The stub further includes a "deferfile" file identifier that includes the original file name for each respective large file within the "Large File" section of the original content.

In response to receipt of this content with the inserted stub for the "Large File" section, the computing device 102 may identify the content as deferred content via the "stub" tag pair and via the "deferfile" file identifier. The computing device 102 may perform processing as described in more detail below in response to detection of such a stub to automatically identify the current network connection, within the present example a 3G connection, and may determine that a network connection faster than a 3G connection is requested by the server 106 for download of this portion of content. The computing device 102 may configure download of the deferred content in response to connectivity via a network with characteristics that exceed the current 3G network connection and may automatically request the deferred content using the filename identified within the "deferfile" file identifier. It is understood that request of this deferred content may be performed via any suitable file request protocol, such as a hypertext transfer protocol (HTTP) GET message, a file transfer protocol (FTP) file download, or any other processing as appropriate for a given implementation.

Further referring again to the second example pseudo code above, it is noted that the "Sensitive Information" section of the content also includes content stubs. As described above, it is assumed that the 3G network connection via which the computing device 102 requested the content is an unsecure connection and that the server 106 is configured to defer any such content requests received and detected via such a connection.

As such, the second example pseudo code above includes a content "stub" tag pair that encapsulates each of the "income" attribute and the "taxbracket" attribute from the original content shown within the first example pseudo code above. It is further noted that an additional tag pair "securecontent" encapsulates the original tag name "income" and "taxbracket" within the respective content stubs.

In response to receipt of this content with the inserted stubs for the "Sensitive Information" section, the computing device 102 may identify the respective content portions as deferred content via the "stub" tag pair and may further determine download constraints via the "securecontent" file identifier. The computing device 102 may perform processing as described in more detail below in response to detection of each such stub to identify each respective content portion as secure content. It is understood that, though not depicted within the present example, the "securecontent" tag pair may further be augmented to include a security level required for download of the content.

The computing device 102 may also be configured to automatically identify the current network connection as unsecure and may identify a level of security associated with the current network connection, within the present example a 3G connection that is unsecure. The computing device 102 may configure download of the deferred content in response to connectivity via a network with security characteristics that meet a configured "securecontent" rating or with security characteristics that exceed the security level of the current network connection, as appropriate for a given implementation, and may automatically request the deferred content using the attributes "income" and "taxbracket" associated with the respective "tag" identifiers within the inserted content stubs in response to detection of such a network connection. Alternatively, where the "securecontent" tag pair is augmented to include a security level required for download of the content, the computing device 102 may configure automated download of the deferred content portions in response to detection of a network connection associated with the designated security level. It is understood that request of these deferred content portions may be performed via any suitable file request protocol, such as an HTTP GET message, an FTP file download, or any other processing as appropriate for a given implementation.

It should be noted that while the second example pseudo code above shows specific forms of content identifiers associated with the content stubs, other content identifiers are possible. For example, uniform resource locators (URLs) may be used in place of the content identifiers shown above to allow a computing device, such as the computing device 102, to directly provide for link selection by a user for the respective deferred content. Many other possibilities exist for deferred content identification and all are considered within the scope of the present subject matter. Further, for purposes of the present subject matter, any form of content identifier may be considered a "content pointer" useable to request deferred content portions.

The following third example pseudo code illustrates one possible modification of the second example pseudo code to provide URLs as content identifiers within the Large File section. Other portions of the second example pseudo code are omitted for brevity.

```
<Body>
...
<!-- Large File section of movies and pictures -->
<titles>
<movie>
<file="http://www.domain.com/images/video.mpg" />
</movie>
<picture>
<file="http://www.domain.com/images/face.jpg"/>
</picture>
</titles>
...
</Body>
```

As can be seen from the third example pseudo code above, a URL "http://www.domain.com/images/video.mpg" provides a link to the "video.mpg" file and a URL http://www.domain.com/images/face.jpg provides a link to the "face.jpg" file. The client device 102 may automatically use the respective links to retrieve the respective files in response to detection of a network connection that satisfies download constraints (e.g., network speed). The client device 102 may alternatively display an indication/prompt to a user via the display 204 with the one or more of the links as hypertext links and may obtain the respective file in response to a detected selection of one of the hypertext links via the input device 206.

As such, the example pseudo code sections above show that a server device, such as the server 106, may defer content for later download in response to determinations of download constraints. Such a server device may replace the deferred content with inserted content stubs at locations within the content file associated with the original content that has been deferred. Such a server device may also identify and communicate the download characteristics to a requesting client device, such as the computing device 102. The respective client device may automatically configure download of deferred content based upon analysis of a current network connection and/or based upon specific indications of download constraints in association with content stubs. Many other possibilities exist for communication of content stubs that identify deferred content portions and download constraints, and for either identification of download constraints or automated determination of download constraints in response to receipt of content stubs and configuration of automated retrieval of deferred content portions. Accordingly, all such possibilities are considered within the scope of the present subject matter.

FIG. 3 through FIG. 6B below describe example processes that may be executed by devices, such as the core processing module 200, to perform the automated network-aware structured content downloads associated with the present subject matter. Many other variations on the example processes are possible and all are considered within the scope of the present subject matter. The example processes may be performed by modules, such as the network-aware download module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

Figure 3:
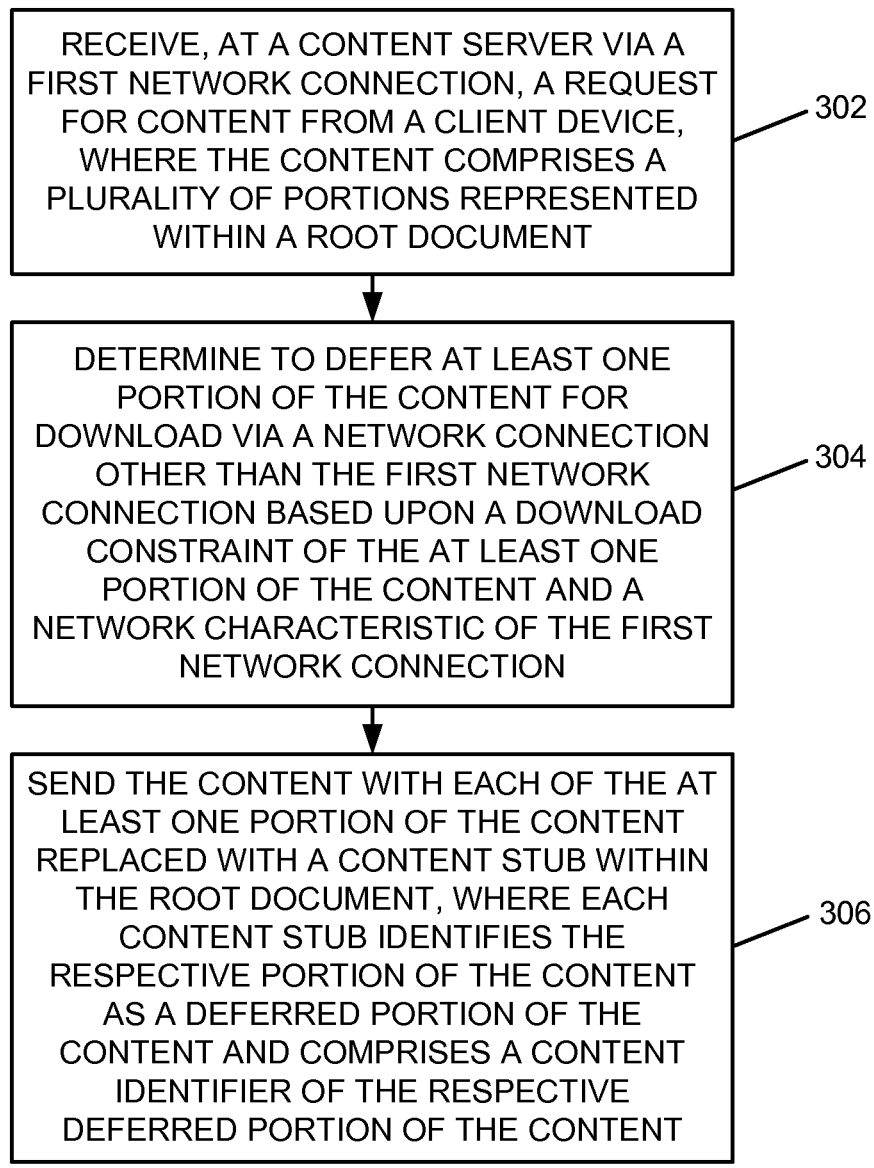
FIG. 3 is a flow chart of an example of an implementation of a process for server-side processing for automated network-aware structured content downloads according to an embodiment of the present subject matter.

FIG. 3 is a flow chart of an example of an implementation of a process 300 for server-side processing for automated network-aware structured content downloads. At block 302, the process 300 receives, at a content server via a first network connection, a request for content from a client device, where the content comprises a plurality of portions represented within a root document. At block 304, the process 300 determines to defer at least one portion of the content for download via a network connection other than the first network connection based upon a download constraint of the at least one portion of the content and a network characteristic of the first network connection. At block 306, the process 300 sends the content with each of the at least one portion of the content replaced with a content stub within the root document, where each content stub identifies the respective portion of the content as a deferred portion of the content and comprises a content identifier of the respective deferred portion of the content.

Figure 4:
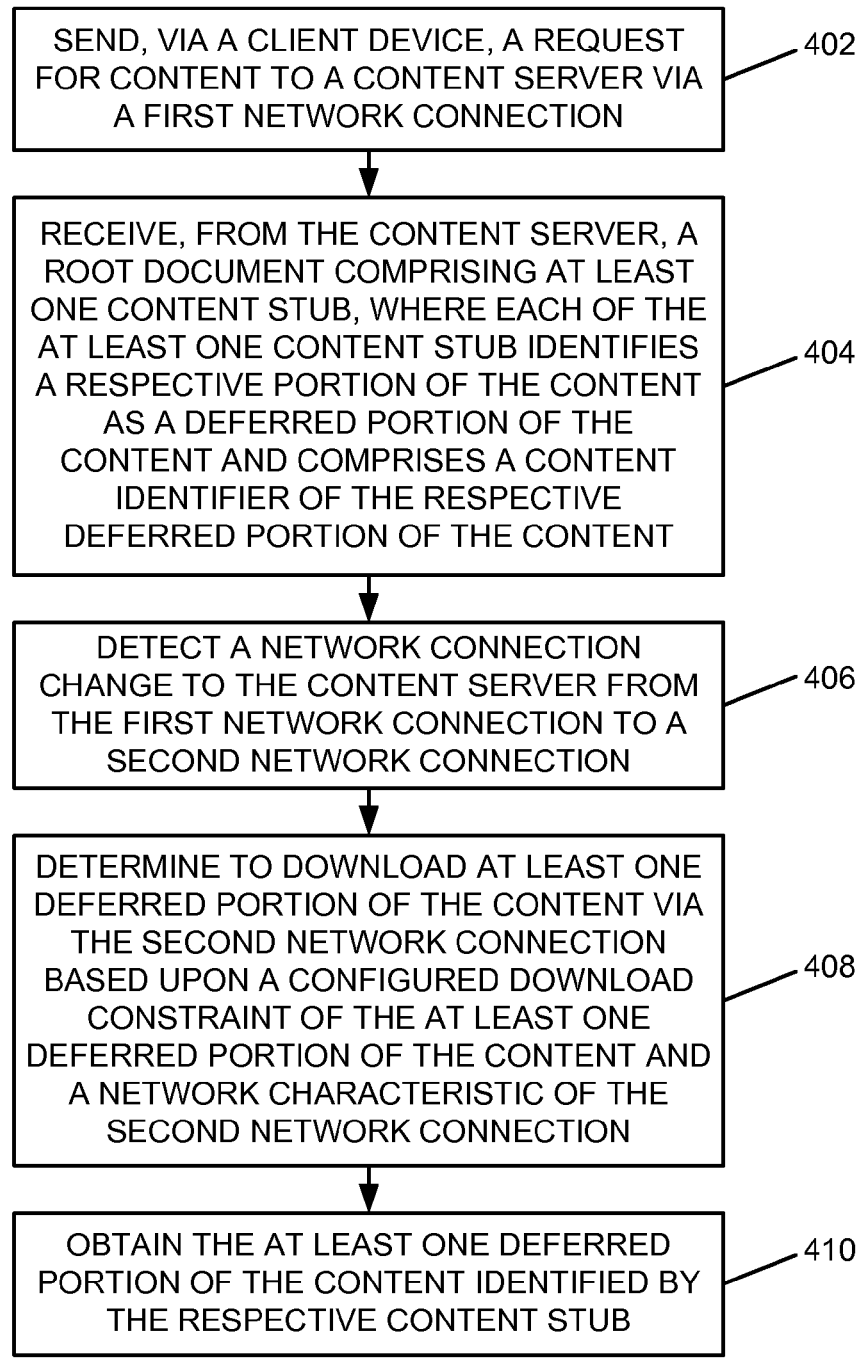
FIG. 4 is a flow chart of an example of an implementation of a process for client-side processing for automated network-aware structured content downloads according to an embodiment of the present subject matter.

FIG. 4 is a flow chart of an example of an implementation of a process 400 for client-side processing for automated network-aware structured content downloads. At block 402, the process 400 sends, via a client device, a request for content to a content server via a first network connection. At block 404, the process 400 receives, from the content server, a root document comprising at least one content stub, where each of the at least one content stub identifies a respective portion of the content as a deferred portion of the content and comprises a content identifier of the respective deferred portion of the content. At block 406, the process 400 detects a network connection change to the content server from the first network connection to a second network connection. At block 408, the process 400 determines to download at least one deferred portion of the content via the second network connection based upon a configured download constraint of the at least one deferred portion of the content and a network characteristic of the second network connection. At block 410, the process 400 obtains the at least one deferred portion of the content identified by the respective content stub.

Figure 5A:
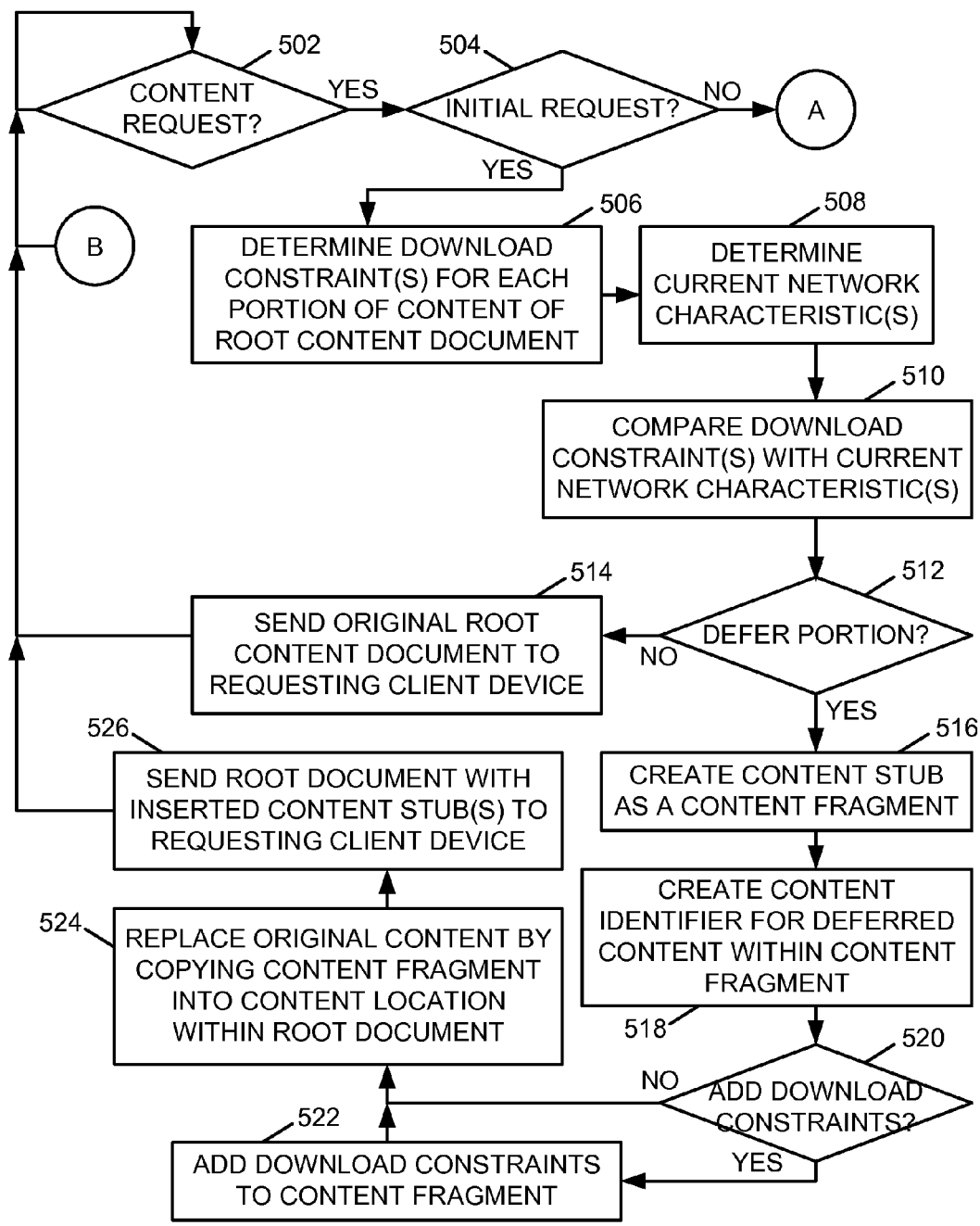
FIG. 5A is a flow chart of an example of an implementation of initial processing within a process for server-side processing for automated network-aware structured content downloads according to an embodiment of the present subject matter.
Figure 5B:
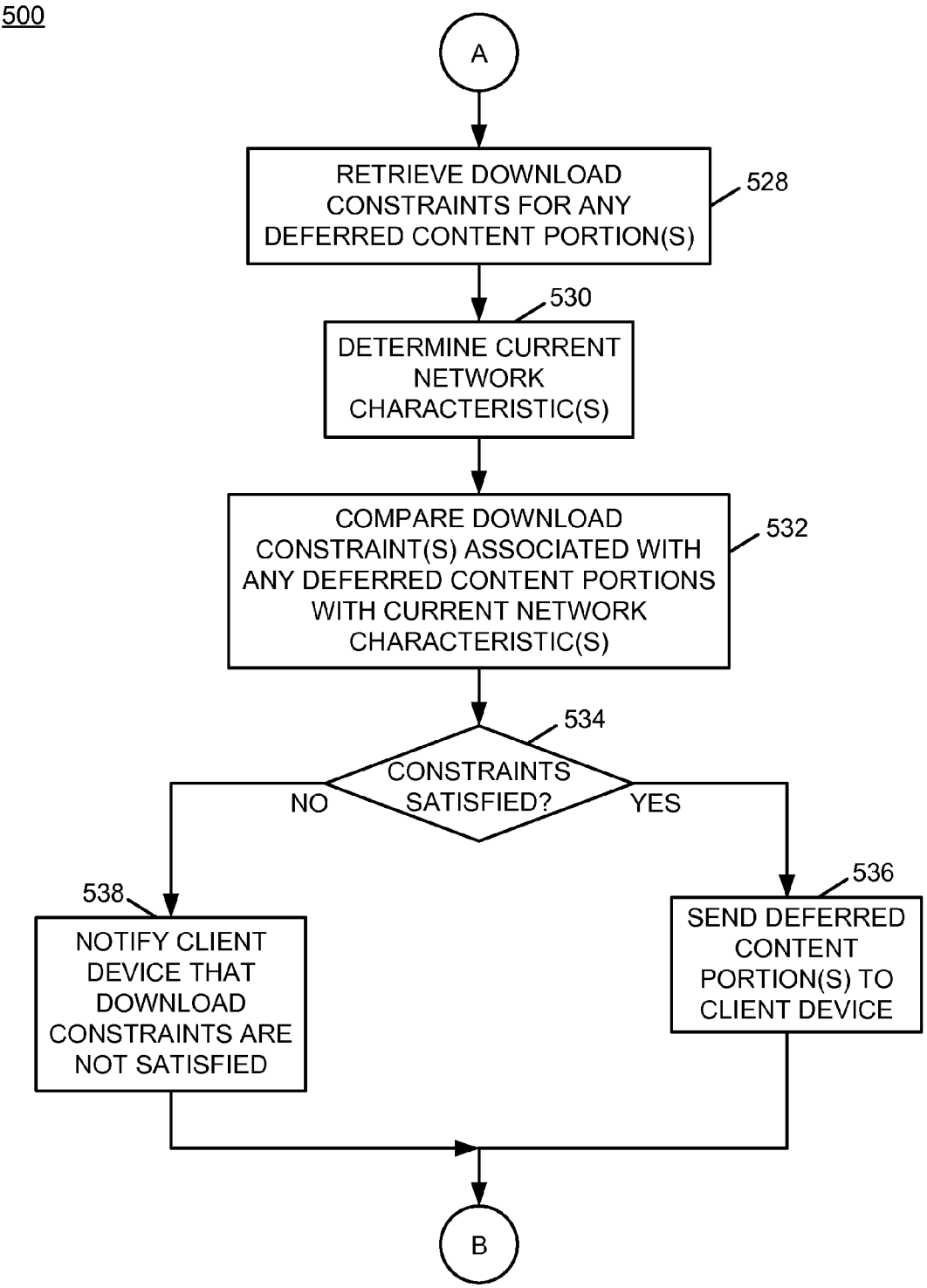
FIG. 5B is a flow chart of an example of an implementation of additional processing within a process for server-side processing for automated network-aware structured content downloads according to an embodiment of the present subject matter.

FIGS. 5A-5B illustrate a flow chart of an example of an implementation of process 500 for server-side processing for automated network-aware structured content downloads. FIG. 5A illustrates initial processing within the process 500. It should be understood that the processing described in association with the process 500 may include branches that may be processed concurrently via different branch threads as appropriate for each content portion. At decision point 502, the process 500 determines whether a content request has been received/detected. A content request may be received, for example, from a client device such as the computing device 102. The content request may further include either an initial request for a root document or may include a request for a deferred portion of content associated with a root document of a previous content request. It should further be noted that the process 500 may automatically detect changes of network connections with client devices from an initial network connection from which content download was deferred to a second or subsequent network connection. In such a situation, the process 500 may automatically trigger a content request event that initiates processing for the process 500 to determine whether any deferred portions of content for one or more client devices may be downloaded via the second or subsequent network connection.

In response to determining at decision point 502 that a content request has been received, the process 500 makes a determination at decision point 504 as to whether the content request is an initial request for content associated with a root document or is a request for a portion of content deferred from a previous content request. Processing associated with deferred content requests for portions of content will be described in more detail below following a description of initial request processing for a root document content request.

As such, in response to determining that the content request is an initial content request, the process 500 determines one or more download constraints for each portion of content of the root document at block 506. As described above, the download constraints may include constraints related to network speed, network security, request source (e.g. from a person with certain security clearance), or other constraints as described in more detail above. Other examples of download constraints include a size of each portion of the content, a content type, a content source, a minimum network download speed, a minimum network download speed for a type of content, a minimum communication resource utilization availability, a security classification of each portion of the content, a minimum network security level, an account download bandwidth limitation, and an account download cost limitation.

At block 508, the process 500 determines one or more current network characteristics of a network via which the content request was received. As also described above, the network characteristics may include network speed, and/or network security. Additionally, other characteristics such as a request source may also be determined.

At block 510, the process 500 compares the download constraints(s) with the current network characteristic(s). At decision point 512, the process 500 makes a determination as to whether to defer any portion of the root document for download via a different network that satisfies any download constraints of any portions of the root document. Such a determination may include a determination that a download constraint identifies a network download characteristic greater than the network characteristic of the current network. For example, the download constraint may indicate that a network of certain network speed characteristics be used to download a given portion and the current network may have lower-speed capabilities than indicated by the download constraint. Alternatively, the download constraint may indicate that a secure network be used to download a given portion and the current network may be an unsecure network. Many other possibilities exist for determining that a network download characteristic is greater than a particular network characteristic of a current network and all are considered within the scope of the present subject matter.

In response to determining that all download constraints are satisfied by the current network characteristics (e.g., not to defer any portion of the root document) at decision point 512, the process 500 sends the original root content document to the requesting device at block 514 and returns to decision point 502 to await another content request.

In response to determining at decision point 512 to defer at least one portion of content associated with the root document (e.g., all download constraints are not satisfied by the current network characteristics), the process 500 creates a content stub as a content fragment for each portion of content determined to be deferred at block 516. Each content stub may include an extensible markup language (XML) fragment where the root document is an XML document. Many other possibilities exist for content stub creation based upon a particular type of root content document and all are considered within the scope of the present subject matter.

At block 518, the process 500 creates a content identifier of the respective deferred portion of the content within the content stub. The content identifier may include a reference to the particular portion of deferred content, such as a file name of a particular file or a URL that points to the respective deferred content portion. As such, each content stub identifies the respective portion of the content as a deferred portion, such as via a "stub" tag pair and the "deferfile" identifiers described within the pseudo code examples above. Many other possibilities exist for identifying content portions as deferred content portions and all are considered within the scope of the present subject matter.

At decision point 520, the process 500 makes a determination as to whether to add one or more download constraints to the content stub. A download constraint may be added, such as via a "securecontent" tag pair described within the pseudo code examples above. Many other possibilities exist for adding download constraints to content stubs and all are considered within the scope of the present subject matter.

In response to determining at decision point 520 to add one or more download constraints to one or more content stubs, the process 500 adds the respective download constraints to the respective content fragment at block 522. In response to determining not to add one or more download constraints to one or more content stubs at decision point 520 or in response to completion of adding the download constraints at block 522, the process 500 replaces the original content portion within the root document by copying the content fragment into a content location within the root document at block 524. At block 526, the process 500 sends the root document with each content stub that replaces each respective portion of the content to the requesting client device via the current network. The process 500 returns to decision point 502 and iterates as described above.

Returning to the description of decision point 504, in response to determining that the content request is a request for a portion of content deferred from a previous content request, again initiated either via a client device or by automated detection of a network connection change with a client device and internal content request event generation, the process 500 transitions to the processing shown and described in association with FIG. 5B.

FIG. 5B illustrates additional processing associated with the process 500 for server-side processing for automated network-aware structured content downloads. At block 528, the process 500 retrieves download constraints for any deferred content portion(s). At block 530, the process 500 determines one or more current network characteristics of the network via which the content request for the deferred content was received or for which the network change was automatically detected. At block 532, the process 500 compares the download constraints(s) with the current network characteristic(s).

At decision point 534, the process 500 makes a determination as to whether the download constraint(s) are satisfied by the current network characteristics. For example, the process 500 may determine whether one or more network characteristics of the new current network are at least equivalent to the relevant respective download constraint(s) of one or more deferred portions of the content.

In response to determining that the download constraint(s) are satisfied by the current network characteristics, the process 500 sends the deferred content portion(s) to the client device at block 536. In response to determining that the download constraint(s) are not satisfied by the current network connection, the process 500 notifies the client device that the download constraint(s) are not satisfied at block 538. In response to either sending the deferred content portions of the root document associated with the original content request to the client device at block 536, or upon notifying the client device that one or more download constraints are not satisfied by the current network connection at block 538, the process 500 transitions back to the processing described in association with FIG. 5A at decision point 502 and iterates as described above.

As such, the process 500 provides initial content request processing. Download constraints of individual portions of content are compared to relevant network characteristics for each individual portion of the content. Content stubs are created that both identify respective portions of a root content document as deferred content portions and include a content identifier of the respective deferred portion of the content. Download constraints may also be added to the content stub to communicate download constraints to the requesting client device. The process 500 also provides deferred content download processing in response to both client device requests for deferred content portions and in response to automated network change detection. Many other possibilities exist for server-side processing of content requests and for content portion deferral and all are considered within the scope of the present subject matter.

Figure 6A:
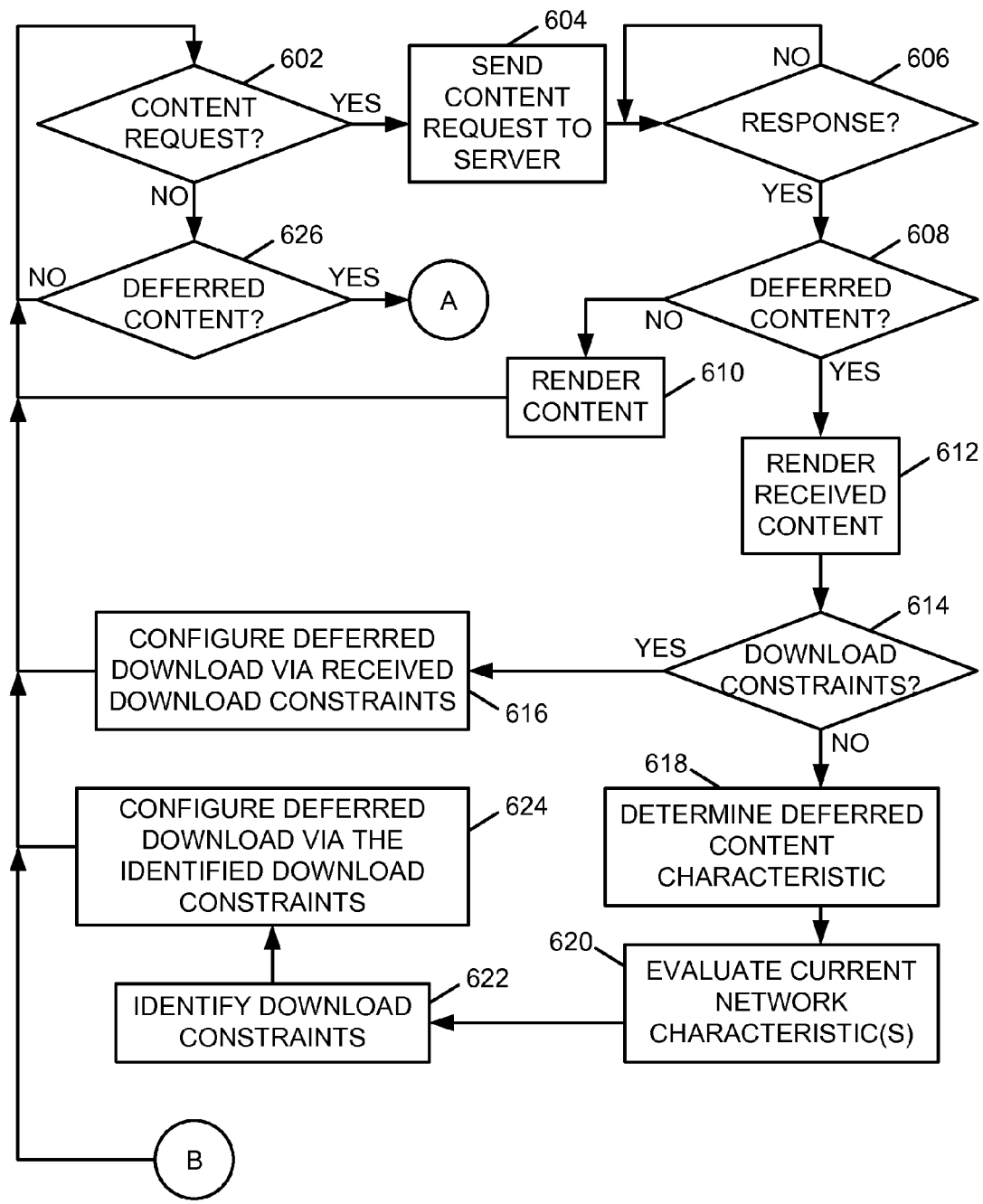
FIG. 6A is a flow chart of an example of an implementation of initial processing within a process for client-side processing for automated network-aware structured content downloads according to an embodiment of the present subject matter.
Figure 6B:
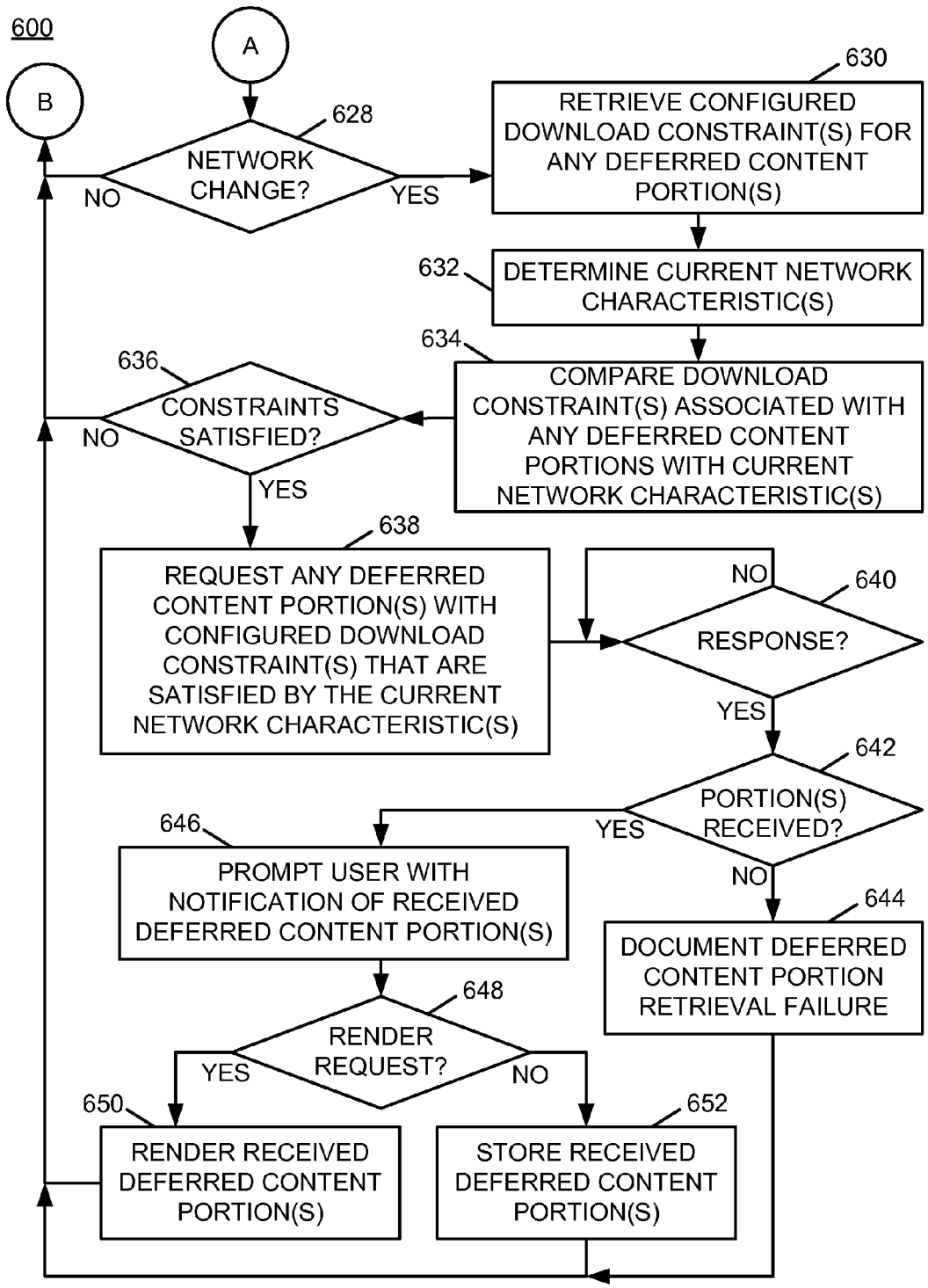
FIG. 6B is a flow chart of an example of an implementation of additional processing within a process for client-side processing for automated network-aware structured content downloads according to an embodiment of the present subject matter.

FIGS. 6A-6B illustrate a flow chart of an example of an implementation of process 600 for client-side processing for automated network-aware structured content downloads. FIG. 6A illustrates initial processing within the process 600. It should be understood that the processing described in association with the process 600 may include branches that may be processed concurrently via different branch threads as appropriate for each content portion. At decision point 602, the process 600 begins higher-level processing by making a determination as to whether a content request has been detected/received. The content request may, for example, be detected in response to user input to access a root content document via a browser or other application. In response to determining that an initial content request has been detected, the process 600 sends a request for the content to a content server via a current network connection at block 604. At decision point 606, the process makes a determination as to whether a response from the server has been received.

In response to determining that a response from the server has been received, the process 600 makes a determination at decision point 608 as to whether any content associated with a requested root content document has been deferred by the server. Content may be deferred by receiving from the content server a root document including at least one content stub. Each content stub identifies the respective portion of the content as a deferred portion of the content and includes a content identifier of the respective deferred portion of the content. Download constraints may also be included within content stubs. A content stub may include an extensible markup language (XML) fragment that replaces each identified deferred portion of the content within the root document, or other form of content stub as appropriate for a given implementation. As described above, a server may replace portions of content within a root document with a content stub that identifies the respective portion(s) as deferred content and that includes a content identifier. As also described above, content may be deferred by a content server based upon download constraints of portions of content within a root document compared to current network characteristics, such as speed, security, and other network characteristics, a content source, or other characteristics.

In response to determining that no content has been deferred, the process 600 renders all content received at block 610 and returns to decision point 602 and iterates as described above and in more detail below. In response to determining that at least one portion of the content of the root document has been deferred, the process 600 renders the received content received at block 612.

At decision point 614, the process 600 makes a determination as to whether one or more download constraint(s) were received within a content stub that identifies the respective deferred content. In response to determining that one or more download constraint(s) were received within a content stub, the process 600 configures deferred download of the respective portion(s) of content via the received download constraints at block 616 and returns to decision point 602 and iterates as described above and in more detail below.

In response to determining at decision point 614 that one or more download constraint(s) were not received within a content stub, the process 600 determines a deferred content characteristic of each deferred portion of content at block 618. A deferred content characteristic may include determining a content type (e.g., static content, large file, sensitive information, etc.). At block 620, the process 600 evaluates current network characteristics, such as network speed, security level, and other network characteristics. At block 622, the process 600 identifies one or more download constraints for each deferred portion of content. For example, the process 600 may determine a network download characteristic that is greater than a network characteristic of the current network based upon the determined content characteristic(s) and may identify the download constraint(s) as network characteristics that exceed the current network characteristics. At block 624, the process 600 configures the download constraint for each deferred portion of the content as the identified/determined network download characteristic(s), and returns to decision point 602 and iterates as described above and in more detail below.

Returning to the description of decision point 602, in response to determining that an initial content request has not been detected, the process 600 makes a determination at decision point 626 as to whether any deferred content is being monitored or tracked for download via a network other than an initial network associated with an initial content request. In response to determining that no portion of deferred content is being monitored or tracked for download, the process 600 returns to decision point 602 and iterates as described above and in more detail below.

In response to determining at decision point 626 that at least one portion of deferred content is being monitored or tracked for download via a network other than an initial network associated with an initial content request, the process 600 transitions to the processing shown and described in association with FIG. 6B.

FIG. 6B illustrates additional processing associated with the process 600 for client-side processing for automated network-aware structured content downloads. At decision point 628, the process 600 makes a determination as to whether a network change has been detected relative to the initial network associated with an initial content request. In response to determining that no network change has been detected, the process 600 returns to the processing described in association with FIG. 6A at block 602 and iterates as described above.

In response to determining that a network change has been detected at decision point 628, the process 600 retrieves one or more configured download constraints for download of the respective deferred content portion(s) at block 630. At block 632, the process 600 determines current network characteristic(s). At block 634, the process 600 compares the download constraint(s) associated with any deferred content portions with the current network characteristic(s).

At decision point 636, the process 600 makes a determination as to whether the configured download constraint(s) are satisfied by the current network characteristics. For example, the process 600 may determine whether one or more network characteristics of the new current network are at least equivalent to the relevant respective configured download constraint(s) of one or more deferred portions of the content. In response to determining that the configured download constraint(s) are not satisfied by the current network characteristic(s), the process 600 returns to the processing described in association with FIG. 6A at block 602 and iterates as described above.

In response to determining that the configured download constraint(s) are satisfied by the current network characteristic(s) at decision point 636, the process 600 requests any deferred content portion(s) with configured download constraint(s) that are satisfied by the current network characteristic(s) from the respective content server at block 638. At decision point 640, the process 600 makes a determination as to whether a response from the respective content server has been received.

In response to receipt of a response from the content server, the process 600 makes a determination at decision point 642 as to whether the requested portion(s) of the content have been received. In response to determining that one or more of the requested portion(s) of the deferred content have not been received, the process 600 documents/logs a deferred content portion retrieval failure for each retrieval failure at block 644 and returns to the processing described in association with FIG. 6A at block 602 and iterates as described above.

In response to determining at decision point 642 that one or more of the requested portion(s) of the deferred content have been received, the process 600 prompts a user, such as via the display device 204, with a notification of any received deferred content portion(s) at block 646. At decision point 648, the process 600 makes a determination as to whether a request to render the received deferred content portion(s) has been detected, such as via the input device 206. In response to determining that a request to render the received deferred content portion(s) has been detected, the process 600 renders the received deferred content portion(s) at block 650. In response to determining that a request to render the received deferred content portion(s) has not been detected, the process 600 stores the received deferred content portion(s) at block 652, such as within the deferred content storage area 214 of the memory 210. In response to either rendering the received deferred content portion(s) at block 650, or in response to storing the received deferred content portion(s) at block 652, the process 600 returns to the processing described in association with FIG. 6A at block 602 and iterates as described above.

As such, the process 600 processes initial content requests for root documents and configures download constraints for any content identified as deferred via content stubs within a root document received from a server. The process 600 may configure the download constraints by analysis of current network characteristics relative to content characteristics of the deferred content portions, or may configure the download constraints based upon download constraints provided within a content stub associated with the deferred content portions. The process 600 monitors/tracks deferred content portions and automatically detects network connection changes, and initiates download of deferred content portions where the configured download constraints are satisfied by the new current network connection. Many other possibilities exist for client-side processing of content requests and for content portion deferral processing and all are considered within the scope of the present subject matter.

As described above in association with FIG. 1 through FIG. 6B, the example systems and processes provide automated network-aware structured content downloads. Many other variations and additional activities associated with automated network-aware structured content downloads are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
by a client device:
determining a content characteristic of a content portion of a content document;
evaluating a current network characteristic of a first network connection in association with the determined content characteristic of the content portion of the content document;
determining a network download characteristic associated with the determined content characteristic of the content portion of the content document that is greater than the evaluated current network characteristic of the first network connection based upon the determined content characteristic;
configuring a download constraint of the content portion of the content document as the determined network download characteristic;
sending a request for the content document to a content server via the first network connection, where the current network characteristic of the first network connection differs from the configured download constraint that network connectivity must satisfy to download the content portion of the content document, and where the content portion of the content document comprises data specified within and renderable as part of the content document;
downloading, from the content server over the first network connection that does not satisfy the configured download constraint, a root document that omits the content portion of the content document and that comprises a content stub that replaces the content portion of the content document, where the content stub comprises an extensible markup language (XML) fragment that replaces the content portion of the content document within the root document, where the content stub identifies the content portion of the content document using a content identifier and specifies the configured download constraint, and where the content identifier comprises a content pointer to the content portion of the content document selected from a group consisting of an XML attribute of an XML tag within the content document that identifies the content portion of the content document and a uniform resource locator (URL) that provides a link to the content portion of the content document;
detecting a network connection change to the content server from the first network connection to a second network connection;
determining that a network characteristic of the second network connection satisfies the configured download constraint to download the content portion of the content document; and
downloading, via the second network connection that satisfies the configured download constraint, the content portion of the content document omitted from the download with the root document using the content identifier within the content stub.

2. The method of claim 1, where determining that the network characteristic of the second network connection satisfies the configured download constraint to download the content portion of the content document comprises:
retrieving the configured download constraint specified for the content portion of the content document; and
determining that the configured download constraint specified for the content portion of the content document is at least equivalent to the network characteristic of the second network connection.

3. The method of claim 1, where the configured download constraint comprises at least one of a size of the content portion of the content document, a content type, a content source, a minimum network download speed, a minimum network download speed for a type of content, a minimum communication resource utilization availability, a security classification of the content portion of the content document, a minimum network security level, an account download bandwidth limitation, and an account download cost limitation.

4. The method of claim 1, further comprising the client device:
prompting, responsive to downloading the content portion via the second network connection, a user of the client device with a notification of the downloaded content portion of the content document;
determining whether a request to render the downloaded content portion of the content document has been detected; and
rendering the downloaded content portion of the content document in response to determining that the request to render the downloaded content portion of the content document has been detected.

5. A system, comprising:
a communication device; and
a processor at a client device programmed to:
determine a content characteristic of a content portion of a content document;
evaluate a current network characteristic of a first network connection in association with the determined content characteristic of the content portion of the content document;
determine a network download characteristic associated with the determined content characteristic of the content portion of the content document that is greater than the evaluated current network characteristic of the first network connection based upon the determined content characteristic;
configure a download constraint of the content portion of the content document as the determined network download characteristic;
send, via the communication device, a request for the content document to a content server via the first network connection, where the current network characteristic of the first network connection differs from the configured download constraint that network connectivity must satisfy to download the content portion of the content document, and where the content portion of the content document comprises data specified within and renderable as part of the content document;
download, from the content server over the first network connection that does not satisfy the configured download constraint, a root document that omits the content portion of the content document and that comprises a content stub that replaces the content portion of the content document, where the content stub comprises an extensible markup language (XML) fragment that replaces the content portion of the content document within the root document, where the content stub identifies the content portion of the content document using a content identifier and specifies the configured download constraint, and where the content identifier comprises a content pointer to the content portion of the content document selected from a group consisting of an XML attribute of an XML tag within the content document that identifies the content portion of the content document and a uniform resource locator (URL) that provides a link to the content portion of the content document;
detect a network connection change to the content server from the first network connection to a second network connection;
determine that a network characteristic of the second network connection satisfies the configured download constraint to download the content portion of the content document; and
download, via the second network connection that satisfies the configured download constraint, the content portion of the content document omitted from the download with the root document using the content identifier within the content stub.

6. The system of claim 5, where, in being programmed to determine that the network characteristic of the second network connection satisfies the configured download constraint to download the content portion of the content document, the processor is programmed to:
retrieve the configured download constraint specified for the content portion of the content document; and
determine that the configured download constraint specified for the content portion of the content document is at least equivalent to the network characteristic of the second network connection.

7. The system of claim 5, where the configured download constraint comprises at least one of a size of the content portion of the content document, a content type, a content source, a minimum network download speed, a minimum network download speed for a type of content, a minimum communication resource utilization availability, a security classification of the content portion of the content document, a minimum network security level, an account download bandwidth limitation, and an account download cost limitation.

8. The system of claim 5, further comprising a display, and where the processor is further programmed to:
prompt, responsive to downloading the content portion via the second network connection, a user of the client device with a notification of the downloaded content portion of the content document;
determine whether a request to render the downloaded content portion of the content document has been detected; and
render, via the display, the downloaded content portion of the content document in response to determining that the request to render the downloaded content portion of the content document has been detected.

9. A computer program product comprising:
a computer readable storage memory having computer readable program code embodied therewith, where the computer readable program code when executed on a computer at a client device causes the computer to:
determine a content characteristic of a content portion of a content document;
evaluate a current network characteristic of a first network connection in association with the determined content characteristic of the content portion of the content document;
determine a network download characteristic associated with the determined content characteristic of the content portion of the content document that is greater than the evaluated current network characteristic of the first network connection based upon the determined content characteristic;
configure a download constraint of the content portion of the content document as the determined network download characteristic;
send a request for the content document to a content server via the first network connection, where the current network characteristic of the first network connection differs from the configured download constraint that network connectivity must satisfy to download the content portion of the content document, and where the content portion of the content document comprises data specified within and renderable as part of the content document;

download, from the content server over the first network connection that does not satisfy the configured download constraint, a root document that omits the content portion of the content document and that comprises a content stub that replaces the content portion of the content document, where the content stub comprises an extensible markup language (XML) fragment that replaces the content portion of the content document within the root document, where the content stub identifies the content portion of the content document using a content identifier and specifies the configured download constraint, and where the content identifier comprises a content pointer to the content portion of the content document selected from a group consisting of an XML attribute of an XML tag within the content document that identifies the content portion of the content document and a uniform resource locator (URL) that provides a link to the content portion of the content document;

detect a network connection change to the content server from the first network connection to a second network connection;

determine that a network characteristic of the second network connection satisfies the configured download constraint to download the content portion of the content document; and download, via the second network connection that satisfies the configured download constraint, the content portion of the content document omitted from the download with the root document using the content identifier within the content stub.

10. The computer program product of claim 9, where, in causing the computer to determine that the network characteristic of the second network connection satisfies the configured download constraint to download the content portion of the content document, the computer readable program code when executed on the computer causes the computer to:
retrieve the configured download constraint specified for the content portion of the content document; and
determine that the configured download constraint specified for the content portion of the content document is at least equivalent to the network characteristic of the second network connection.

11. The computer program product of claim 9, where the configured download constraint comprises at least one of a size of the content portion of the content document, a content type, a content source, a minimum network download speed, a minimum network download speed for a type of content, a minimum communication resource utilization availability, a security classification of the content portion of the content document, a minimum network security level, an account download bandwidth limitation, and an account download cost limitation.

12. The computer program product of claim 9, where the computer readable program code when executed on the computer further causes the computer to:
prompt, responsive to downloading the content portion via the second network connection, a user of the client device with a notification of the downloaded content portion of the content document;
determine whether a request to render the downloaded content portion of the content document has been detected; and
render, via the display, the downloaded content portion of the content document in response to determining that the request to render the downloaded content portion of the content document has been detected.

* * * * *